United States Patent
Shim et al.

(10) Patent No.: US 8,781,043 B2
(45) Date of Patent: Jul. 15, 2014

(54) SUCCESSIVE EQUALIZATION AND CANCELLATION AND SUCCESSIVE MINI MULTI-USER DETECTION FOR WIRELESS COMMUNICATION

(75) Inventors: Byonghyo Shim, San Diego, CA (US); Inyup Kang, San Diego, CA (US); Farrokh Abrishamkar, San Diego, CA (US); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1261 days.

(21) Appl. No.: 11/560,206

(22) Filed: Nov. 15, 2006

(65) Prior Publication Data

US 2008/0112382 A1    May 15, 2008

(51) Int. Cl.
  *H04B 1/10*    (2006.01)
(52) U.S. Cl.
  USPC ........... 375/350; 375/143; 375/144; 375/147; 375/148; 375/231; 375/232; 375/340; 375/343; 375/348; 375/359; 375/259; 375/260; 375/267; 375/E1.029; 375/E1.03; 375/E1.031; 375/E1.024; 370/335; 370/342; 370/441; 370/479; 455/63.1; 455/67.11; 455/67.13; 455/296; 455/226.1; 455/226.2; 455/226.3; 455/226.4
(58) Field of Classification Search
  USPC ......... 375/144, 147–148, 231–232, 340, 343, 375/348, 350, 359, 138, 141, 259–260, 267, 375/316, 346–347, 349, 240, 285, 358, 143, 375/E1.029, E1.03, E1.031, E1.024; 370/335–337, 342–345, 441–442, 479, 370/280, 319–321, 347, 208; 455/63.1, 455/67.11, 67.13, 453, 33.1, 422, 422.1, 455/550.1, 551, 552.1, 553.1, 296, 455/226.1–226.4

See application file for complete search history.

(56) References Cited

U.S. PATENT DOCUMENTS

| | | | |
|---|---|---|---|
| 5,579,304 | A | 11/1996 | Sugimoto et al. |
| 6,137,788 | A | 10/2000 | Sawahashi et al. |

(Continued)

FOREIGN PATENT DOCUMENTS

| | | |
|---|---|---|
| CN | 101536339 | 9/2009 |
| EP | 1098452 A1 | 5/2001 |

(Continued)

OTHER PUBLICATIONS

Varanasi, M., Group Detection For Synchronous Gaussian Code-Division Multiple-Access Channels, Jul. 1995, Information Theory, IEEE Transactions on, vol. 41, Issue 4, pp. 1083-1096.*

(Continued)

*Primary Examiner* — Daniel Washburn
*Assistant Examiner* — Rahel Guarino
(74) *Attorney, Agent, or Firm* — Ramin Mobarhan

(57) ABSTRACT

Techniques for recovering a desired transmission in the presence of interfering transmissions are described. For successive equalization and cancellation (SEC), equalization is performed on a received signal to obtain an equalized signal for a first set of code channels. The first set may include all code channels for one sector, a subset of all code channels for one sector, multiple code channels for multiple sectors, etc. Data detection is then performed on the equalized signal to obtain a detected signal for the first set of code channels. A signal for the first set of code channels is reconstructed based on the detected signal. The reconstructed signal for the first set of code channels is then canceled from the received signal. Equalization, data detection, reconstruction, and cancellation are performed for at least one additional set of code channels in similar manner.

37 Claims, 8 Drawing Sheets

(56) References Cited

U.S. PATENT DOCUMENTS

| | | | |
|---|---|---|---|
| 6,240,099 B1 | 5/2001 | Lim et al. | |
| 6,363,103 B1* | 3/2002 | Buehrer et al. | 375/148 |
| 6,404,760 B1 | 6/2002 | Holtzman et al. | |
| 6,665,288 B1 | 12/2003 | Ottosson et al. | |
| 6,667,964 B1 | 12/2003 | Seki et al. | |
| 6,760,315 B1* | 7/2004 | Esmailzadeh et al. | 370/310 |
| 6,928,104 B2 | 8/2005 | Pan et al. | |
| 6,956,893 B2* | 10/2005 | Frank et al. | 375/147 |
| 6,963,546 B2 | 11/2005 | Misra et al. | |
| 7,035,284 B2 | 4/2006 | Willenegger et al. | |
| 7,190,710 B2* | 3/2007 | Yousef et al. | 375/148 |
| 7,266,168 B2 | 9/2007 | Kwak et al. | |
| 7,280,585 B2* | 10/2007 | Sriram et al. | 375/148 |
| 7,302,233 B2* | 11/2007 | Onggosanusi et al. | 455/67.13 |
| 7,339,980 B2* | 3/2008 | Grant et al. | 375/148 |
| 7,428,260 B2* | 9/2008 | Yellin | 375/147 |
| 7,469,003 B2 | 12/2008 | Papasakellariou | |
| 7,477,634 B1* | 1/2009 | McKown | 370/342 |
| 2002/0012264 A1 | 1/2002 | Ishiwara | |
| 2002/0018451 A1* | 2/2002 | Sharony | 370/329 |
| 2002/0131390 A1 | 9/2002 | Kuo et al. | |
| 2002/0196841 A1* | 12/2002 | Karna | 375/147 |
| 2003/0012264 A1 | 1/2003 | Papasakellariou et al. | 375/148 |
| 2003/0072397 A1* | 4/2003 | Kim et al. | 375/347 |
| 2003/0142655 A1 | 7/2003 | Higuchi et al. | |
| 2003/0156630 A1* | 8/2003 | Sriram et al. | 375/148 |
| 2004/0013171 A1* | 1/2004 | Pan et al. | 375/147 |
| 2004/0120299 A1* | 6/2004 | Kidiyarova-Shevchenko et al. | 370/342 |
| 2004/0146024 A1* | 7/2004 | Li et al. | 370/334 |
| 2004/0203812 A1 | 10/2004 | Malladi et al. | |
| 2004/0223538 A1* | 11/2004 | Zeira | 375/148 |
| 2005/0094816 A1 | 5/2005 | Lindoff et al. | |
| 2005/0174983 A1 | 8/2005 | Naguleswaran et al. | |
| 2005/0276314 A1 | 12/2005 | Dateki et al. | |
| 2005/0278609 A1* | 12/2005 | Kim et al. | 714/780 |
| 2005/0281214 A1* | 12/2005 | Misra et al. | 370/321 |
| 2006/0239335 A1 | 10/2006 | Rouphael et al. | |
| 2007/0093261 A1 | 4/2007 | Hou et al. | |
| 2007/0104150 A1* | 5/2007 | Fernandez-Corbaton et al. | 370/335 |
| 2007/0110131 A1* | 5/2007 | Guess et al. | 375/148 |
| 2007/0110132 A1* | 5/2007 | Guess et al. | 375/148 |
| 2007/0147329 A1* | 6/2007 | Soriaga et al. | 370/342 |
| 2007/0270100 A1 | 11/2007 | Agrawal et al. | |
| 2008/0112381 A1* | 5/2008 | Shim et al. | 370/342 |
| 2008/0112382 A1* | 5/2008 | Shim et al. | 370/342 |
| 2013/0195232 A1 | 8/2013 | Liang et al. | |

FOREIGN PATENT DOCUMENTS

| | | | | |
|---|---|---|---|---|
| JP | H09505199 A | 5/1997 | | |
| JP | H11136212 A | 5/1999 | | |
| JP | 2994752 B2 | 12/1999 | | |
| JP | 2000083011 A | 3/2000 | | |
| JP | 2000509580 A | 7/2000 | | |
| JP | 2000315993 A | 11/2000 | | |
| JP | 3285725 B2 | 5/2002 | | |
| JP | 2002232397 A | 8/2002 | | |
| JP | 200520402 | 1/2005 | | |
| JP | 2005522088 A | 7/2005 | | |
| JP | 2005533460 A | 11/2005 | | |
| JP | 2006517079 A | 7/2006 | | |
| JP | 2006519528 A | 8/2006 | | |
| WO | WO-9303556 A1 | 2/1993 | | |
| WO | WO-9601544 A2 | 1/1996 | | |
| WO | WO9642146 A1 | 12/1996 | | |
| WO | WO9741647 A1 | 11/1997 | | |
| WO | WO02073937 | 9/2002 | | |
| WO | WO03084097 A1 | 10/2003 | | |
| WO | WO2004070958 A2 | 8/2004 | | |
| WO | WO 2004/079975 | * | 9/2004 | |
| WO | WO 2004/079975 A3 | * | 9/2004 | H04B 1/69 |
| WO | WO2004079975 | 9/2004 | | |
| WO | WO2004095713 | 11/2004 | | |

OTHER PUBLICATIONS

Johansson, et al., Linear Group-Wise Successive Interference Cancellation In CDMA, Sep. 2-4, 1998, Spread Spectrum Techniques and Applications, 1998. Proceedings. 1998 5th International Symposium on, vol. 1, pp. 121-126.*

Bentrica, A. et al., A Linear Group Polynomial-Expansion Successive Interference Cancellation Detector, Sep. 7-10, 2003, Personal Indoor and Mobile Radio Communications, 2003, PMRC 2003, 14th IEEE Proceedings on, vol. 2, pp. 1546-1550.*

Silvester, A., Analysis of Reverse Link Capacity For Cellular CDMA Systems Employing Group Successive Interference Cancellation, 7-10 Maay 2006, Vehicular Technology Conference, 2006. VTC 2006-Spring. IEEE 63rd, vol. 5, pp. 2513-2517.*

Rasmussen, L., A Matrix-Algebraic Approach To Successive Interference Cancellation In CDMA, Jan. 2000, Communications, IEEE Transactions on, vol. 48, Issue 1, pp. 145-151.*

Johansson, A, Linear Group-Wise Successive Interference Cancellation in CDMA, 1998, Spread Spectrum Techniques and Applications, 1998, Proceddings, 1998 IEEE 5th International Symposium on, vol. 1, pp. 121-126.*

International Search Report and Written Opinion—PCT/US2007/084641, International Search Authority—European Patent Office—Aug. 21, 2008.

Tsai C-H et al: "Hybrid MMSE and SIC for Multiuser Detection" IEEE VTS 53rd. Vehicular Technology Conference, vol. Conf. 53, May 6, 2001, pp. 1779-1783, XP001082449 New York, NY, US ISBN: 978-0-7803-6728-9.

European Search Report—EP11009956—Search Authority—The Hague—Feb. 8, 2012.

* cited by examiner

SUCCESSIVE EQUALIZATION AND CANCELLATION AND SUCCESSIVE MINI MULTI-USER DETECTION FOR WIRELESS COMMUNICATION

BACKGROUND

I. Field

The present disclosure relates generally to communication, and more specifically to techniques for recovering transmission in wireless communication.

II. Background

A wireless multiple-access communication system can concurrently communicate with multiple wireless devices, e.g., cellular phones. Examples of such multiple-access systems include Code Division Multiple Access (CDMA) systems, Time Division Multiple Access (TDMA) systems, Frequency Division Multiple Access (FDMA) systems, and Orthogonal FDMA (OFDMA) systems.

A wireless multiple-access system typically includes many base stations that provide communication coverage for a large geographic area. Each base station may transmit data to one or more wireless devices located within its coverage area. A given wireless device may receive a desired transmission from a serving base station as well as interfering transmissions from nearby base stations. These interfering transmissions are intended for other wireless devices located within the coverage areas of the nearby base stations but act as interference to this given wireless device. The interference hinders the wireless device's ability to recover the desired transmission and has a large impact on performance.

There is therefore a need in the art for techniques to recover a desired transmission in the presence of interfering transmissions in a wireless communication system.

SUMMARY

Techniques for recovering a desired transmission in the presence of interfering transmissions are described herein. In one embodiment, which is referred to as successive equalization and cancellation (SEC), equalization is performed on a received signal to obtain an equalized signal for a first set of code channels. The first set may include all code channels for one sector, a subset of all code channels for one sector, multiple code channels for multiple sectors, etc. Data detection is then performed on the equalized signal to obtain a detected signal for the first set of code channels. A signal for the first set of code channels is reconstructed based on the detected signal. The reconstructed signal for the first set of code channels is then canceled from the received signal. Equalization, data detection, reconstruction, and cancellation are performed for at least one additional set of code channels in similar manner. The processing is performed for one set of code channels at a time, e.g., starting with the strongest set for the strongest sector.

In another embodiment, which is referred to as successive mini multi-user detection (SMM), data detection is performed on a received signal to obtain a detected signal for a first set of code channels. A signal for the first set of code channels is reconstructed based on the detected signal. The reconstructed signal for the first set of code channels is then canceled from the received signal. Data detection, reconstruction, and cancellation are performed for at least one additional set of code channels in similar manner. The data detection is performed in different manners for SEC and SMM, as described below.

Various aspects and embodiments of the disclosure are described in further detail below.

DETAILED DESCRIPTION

The techniques described herein may be used for various communication systems such as CDMA, TDMA, FDMA, OFDMA, and Single-Carrier FDMA (SC-FDMA) systems. A CDMA system may implement a radio technology such as cdma2000, Wideband-CDMA (W-CDMA), and so on. cdma2000 covers IS-2000, IS-856, and IS-95 standards. A TDMA system may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. An OFDMA system utilizes OFDM to transmit symbols in the frequency domain on orthogonal frequency subcarriers. An SC-FDMA system transmits symbols in the time domain on orthogonal frequency subcarriers. For clarity, the techniques are described below for a CDMA system, which may be a cdma2000 system or a W-CDMA system.

The techniques may also be used for single-input single-output (SISO), single-input multiple-output (SIMO), multiple-input single-output (MISO), and multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception. For clarity, much of the description below is for a SISO transmission.

Figure 1:
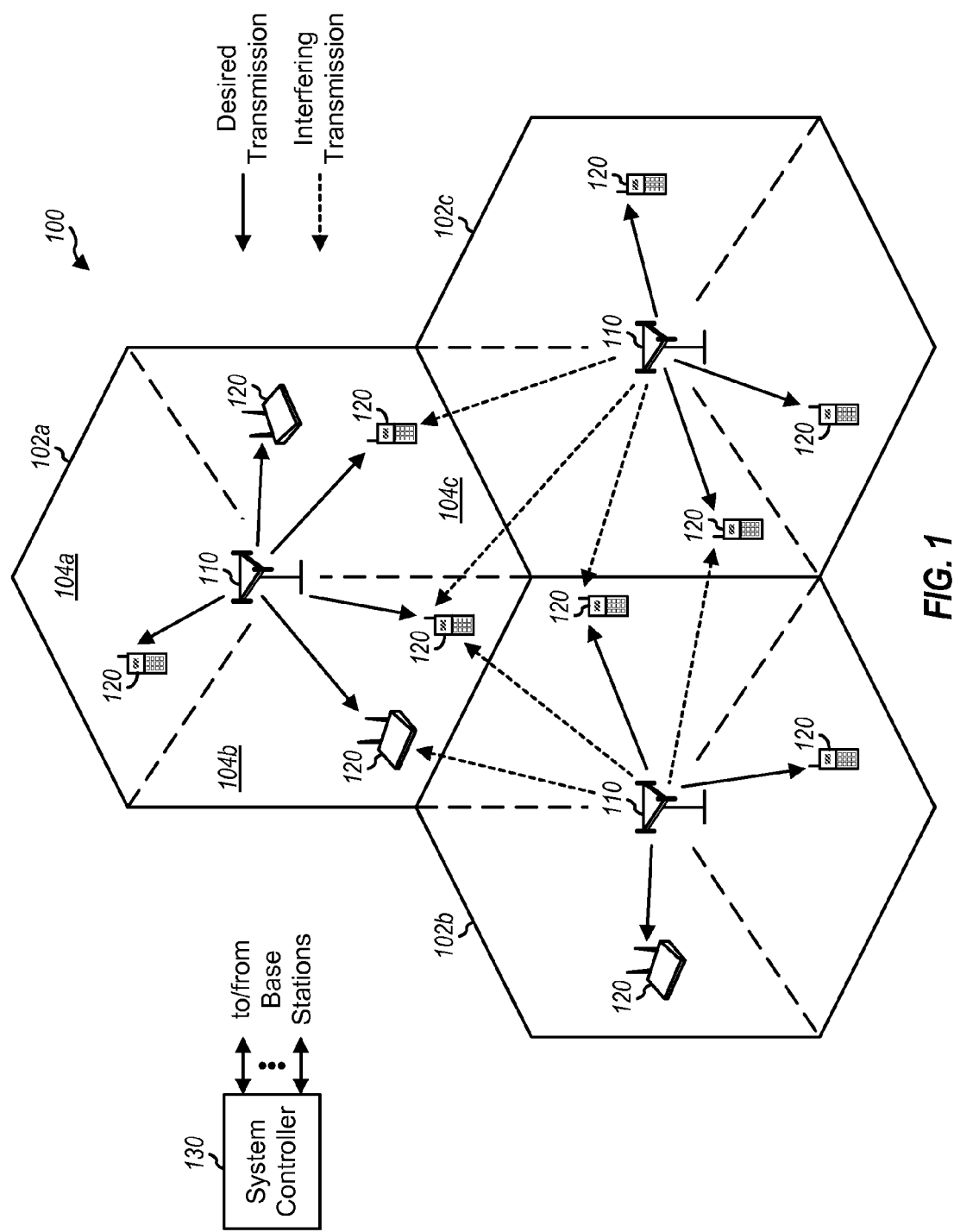
FIG. 1 shows a CDMA system.

FIG. 1 shows a CDMA system 100 with multiple base stations 110 and multiple wireless devices 120. A base station is generally a fixed station that communicates with the wireless devices and may also be called a Node B, an access point, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. A system controller 130 couples to base stations 110 and provides coordination and control for these base stations.

The techniques described herein may be used for systems with sectorized cells as well as systems with un-sectorized cells. In the following description, the term "sector" can refer to (1) a BTS and/or its coverage area for a system with sectorized cells (e.g., in 3GPP2) and (2) a base station and/or its coverage area for a system with un-sectorized cells (e.g., in 3GPP). In the following description, the terms "sector" and "base station" are used interchangeably.

Wireless devices 120 are typically dispersed throughout the system, and each wireless device may be stationary or mobile. A wireless device may also be called a mobile station, a user equipment, a terminal, a station, a subscriber unit, or some other terminology. A wireless device may be a cellular phone, a personal digital assistant (PDA), a wireless modem card, a handheld device, a laptop computer, and so on. A wireless device may communicate with zero, one, or multiple base stations on the forward and reverse links at any given moment. The forward link (or downlink) refers to the communication link from the base stations to the terminals, and the reverse link (or uplink) refers to the communication link from the terminals to the base stations. For simplicity, FIG. 1 shows only transmissions on the forward link.

Figure 2:
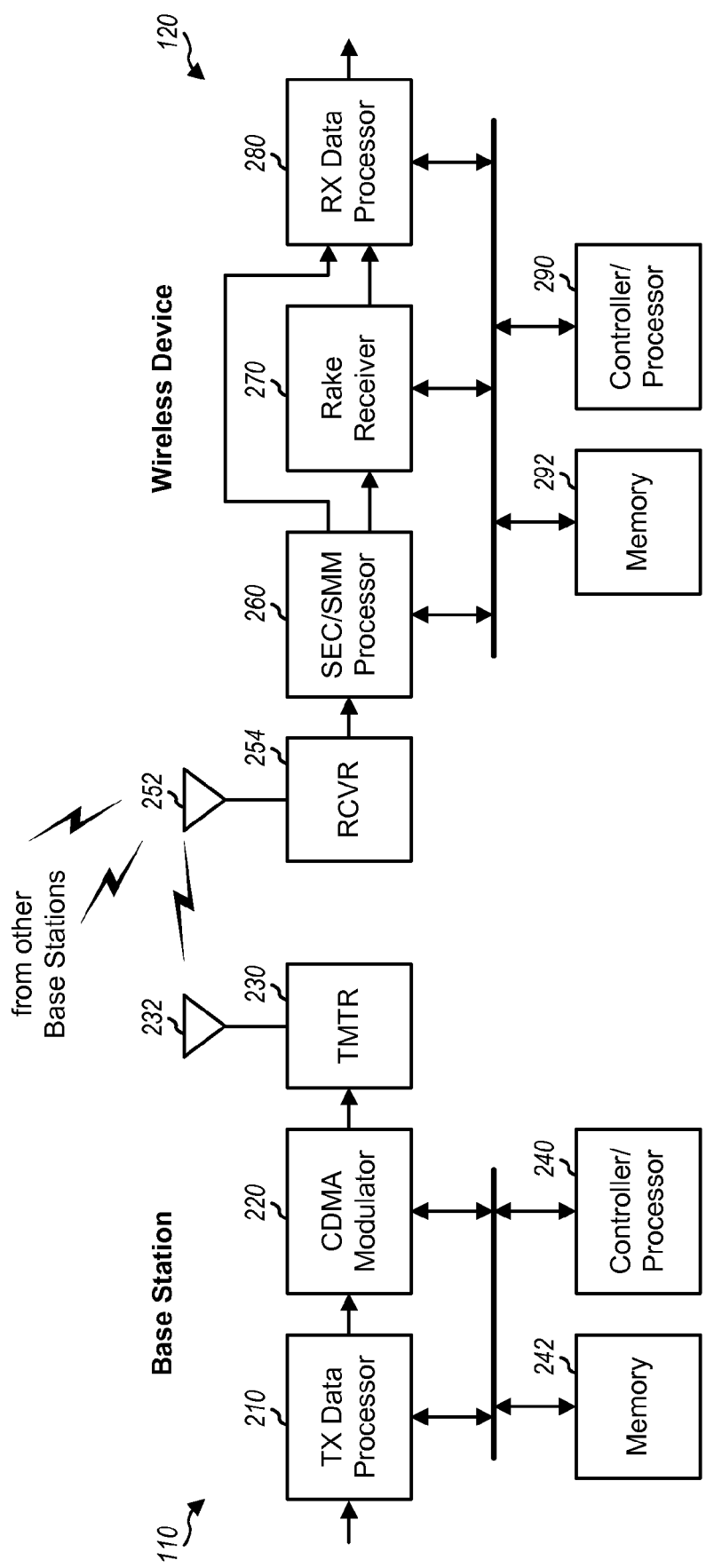
FIG. 2 shows a block diagram of a base station and a wireless device.

FIG. 2 shows a block diagram of a base station 110 and a wireless device 120, which may be one of the base stations and one of the wireless devices shown in FIG. 1. For simplicity, FIG. 2 shows base station 110 having one transmit antenna and wireless device 120 having one receive antenna. In general, base station 110 and wireless device 120 may each be equipped with any number of antennas. For simplicity, FIG. 2 shows only the processing units for data transmission on the forward link.

At base station 110, a transmit (TX) data processor 210 receives traffic data for the wireless devices being served, processes (e.g., encodes, interleaves, and symbol maps) the traffic data to generate data symbols, and provides the data symbols to a CDMA modulator 220. As used herein, a data symbol is a modulation symbol for data, a pilot symbol is a modulation symbol for pilot, a modulation symbol is a complex value for a point in a signal constellation (e.g., for M-PSK or M-QAM), a symbol is generally a complex value, and pilot is data that is known a priori by both the base stations and the wireless devices. CDMA modulator 220 processes the data symbols and pilot symbols as described below and provides output chips. A transmitter (TMTR) 230 processes (e.g., converts to analog, amplifies, filters, and frequency upconverts) the output chip stream and generates a forward link signal, which is transmitted from an antenna 232.

At wireless device 120, an antenna 252 receives the forward link signals from base station 110 as well as other base stations and provides a received signal. A receiver (RCVR) 254 processes (e.g., filters, amplifies, frequency downconverts, and digitizes) the received signal and provides received samples to a processor 260. Processor 260 may perform successive equalization and cancellation (SEC) and/or successive mini multi-user detection (SMM), as described below. Antenna 252 may receive the forward link signal from base station 110 via one or more signal paths, and the received signal may include one or more signal instances (or multipaths) for base station 110. Rake receiver 270 may be used to process all multipaths of interest. Processor 260 or rake receiver 270 provides data symbol estimates, which are estimates of the data symbols sent by base station 110 to wireless device 120. A receive (RX) data processor 280 processes (e.g., symbol demaps, deinterleaves, and decodes) the data symbol estimates and provides decoded data. In general, the processing by processor 260/rake receiver 270 and RX data processor 280 is complementary to the processing by CDMA modulator 220 and TX data processor 210, respectively, at base station 110.

Controllers/processors 240 and 290 direct operation at base station 110 and wireless device 120, respectively. Memories 242 and 292 store data and program codes for base station 110 and wireless device 120, respectively.

In CDMA, multiple orthogonal code channels may be obtained with different orthogonal codes. The code channels may also be referred to as traffic channels, physical channels, data channels, and so on. For example, multiple orthogonal traffic channels are obtained with different Walsh codes in cdma2000, and multiple orthogonal physical channels are obtained with different orthogonal variable spreading factor (OVSF) codes in W-CDMA. The code channels may be used to send different types of data (e.g., traffic data, broadcast data, control data, pilot, and so on) and/or traffic data for different users. Data for the code channels is scaled, combined, and spectrally spread across the entire system bandwidth. The spectral spreading is performed with a spreading code, which is a pseudo-random number (PN) code in cdma2000 and a scrambling code in W-CDMA. In cdma2000, the channelization with Walsh codes is called "covering", and the spectral spreading is called "spreading". In W-CDMA, the channelization with OVSF codes is called "spreading", and the spectral spreading is called "scrambling". For clarity, cdma2000 terminology (e.g., covering, spreading, Walsh codes, and PN code) is used in the following description.

Figure 3:
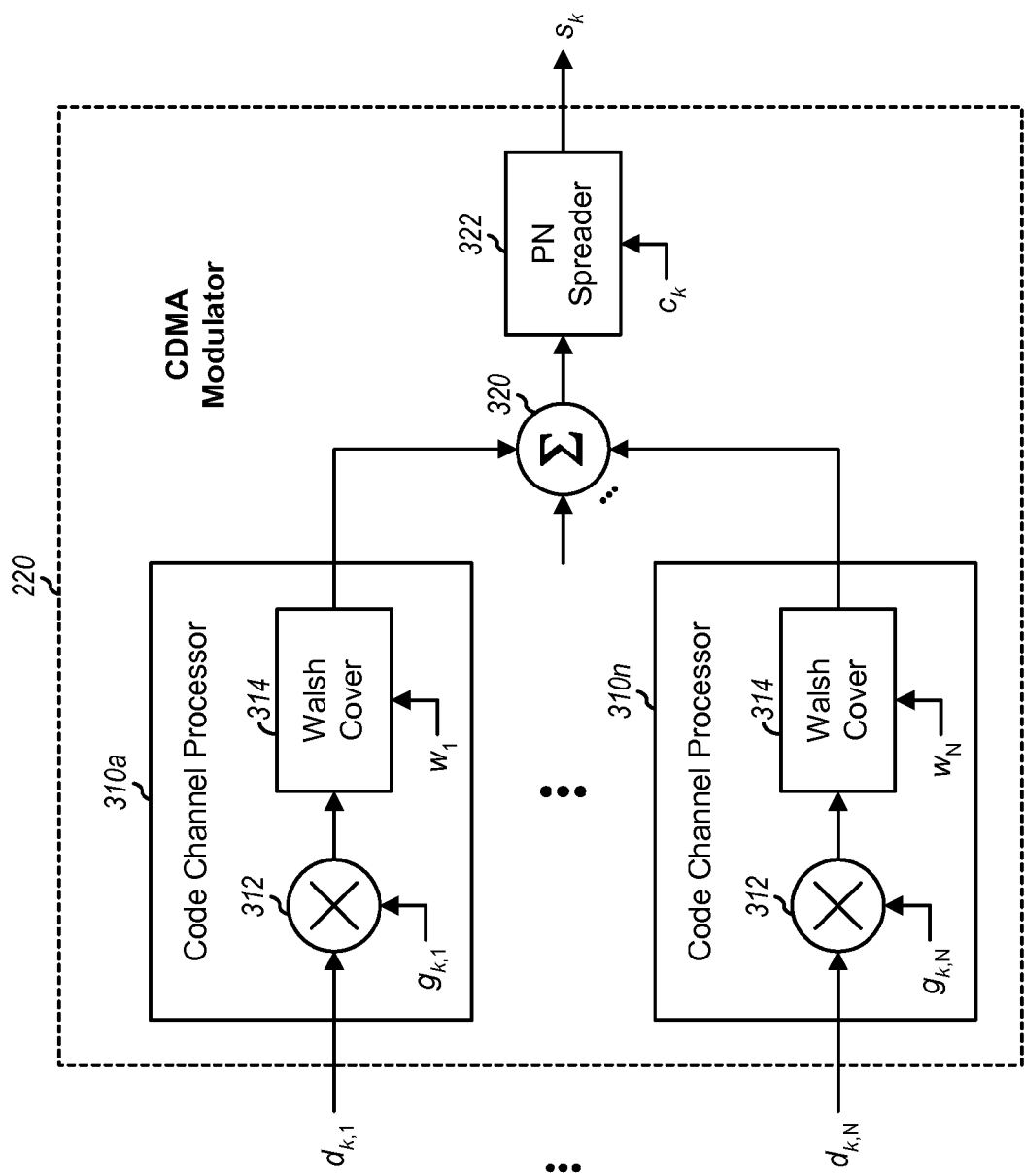
FIG. 3 shows a block diagram of a CDMA modulator.

FIG. 3 shows a block diagram of CDMA modulator 220 within base station 110. For simplicity, the following description assumes that N code channels are available for each sector, and each code channel is assigned a different Walsh code of length N, where N may be equal to 16, 32, 64, 128, 256, or some other value. In general, orthogonal codes of different lengths may be used for the code channels, and N may correspond to the length of the longest orthogonal code. For simplicity, the following description assumes that the N code channels are for N users, and the terms "code channels" and "users" are used interchangeably. In actuality, some code channels are used for overhead, e.g., pilot, control data, broadcast data, etc.

CDMA modulator 220 includes N code channel processors 310a through 310n for the N code channels. Within each code channel processor 310, a multiplier 312 receives and scales the data or pilot symbols for code channel n of sector k with a gain of $g_{k,n}$ and provides scaled symbols. The gain $g_{k,n}$ may be set to zero if code channel n is not used by sector k. A Walsh cover unit 314 channelizes the scaled symbols with a Walsh code $w_n$ for code channel n. Unit 314 performs covering by repeating each scaled symbol to generate N replicated symbols and multiplying the N replicated symbols with the N chips of Walsh code $w_n$ to generate N data chips for that scaled symbol. A combiner 320 receives and adds the data chips for all N code channels. A PN spreader 322 multiplies the combined data chips with a PN code $c_k$ assigned to sector k and generates output chips.

The output chips for sector k in one symbol period, with chip rate sampling, may be expressed in matrix form as follows:

$$s_k = C_k W G_k d_k = A_k d_k, \quad \text{Eq (1)}$$

where $d_k$ is an N×1 vector of data symbols sent on the N code channels of sector k, $G_k$ is an N×N diagonal matrix of gains for the N code channels of sector k, W is an N×N Hadamard matrix containing N Walsh codes in N columns, $C_k$ is an N×N diagonal matrix containing N chips of the PN code for sector k, $A_k$ is an N×N processing matrix for data vector $d_k$, and $S_k$ is an N×1 vector of output chips for sector k.

For clarity, vectors are denoted with bolded and underlined lower case text (e.g., d), and matrices are denoted with bolded and underlined upper case text (e.g., G). A diagonal matrix contains possible non-zero values along the diagonal and zeros elsewhere.

Vector $d_k$ contains N data symbols to be sent simultaneously on N code channels in one symbol period. Matrix $G_k$ contains N gains for the N code channels along the diagonal and zeros elsewhere. The N gains determine the amount of transmit power used for the N code channels. Matrix W contains N Walsh codes for the N code channels in N columns. If the code channels have different Walsh code lengths, then N is equal to the longest Walsh code length for all code channels, and each shorter Walsh code is repeated in matrix W. Since the same Walsh matrix W is used for all sectors, subscript k is not used for W. Matrix $C_k$ contains N PN chips along the diagonal and zeros elsewhere. These PN chips are from the PN code for sector k for one symbol period. Vector $s_k$ contains N output chips transmitted by sector k for all N code channels in one symbol period.

Matrix $A_k$ represents all of the processing observed by data vector $d_k$ and may be expressed as:

$$A_k = C_k W G_k. \qquad \text{Eq (2)}$$

The columns of $A_k$ represent code channels/users, and the rows of $A_k$ represent time.

Wireless device 120 receives the forward link signals from K sectors, which include the serving sector as well as interfering sectors. In general, K may be any value. The received signal for each sector k, without noise, may be expressed as:

$$x_k = H_k C_k W G_k d_k = H_k A_k d_k, \qquad \text{Eq (3)}$$

where $H_k$ is an (N+Δ)×N channel response matrix for sector k, and $x_k$ is an (N+Δ)×1 vector of received samples for sector k.

Δ is the delay spread of the wireless channel, in units of chips. Matrix $H_k$ contains complex channel gains for sector k. Vector $x_k$ contains N+Δ received samples for sector k for one symbol period, in the absence of noise. For simplicity, the description herein is for the case in which $d_k$ covers one symbol period. In general, $d_k$ may cover multiple symbol periods (e.g., the previous, current, and next symbol periods) to account for intersymbol interference (ISI). In this case, the dimensions of the other matrices would increase correspondingly.

The received samples at wireless device 120 for all K sectors may be expressed as:

$$\underline{y} = \sum_{k=1}^{K} \underline{x}_k + \underline{n} = \sum_{k=1}^{K} H_k A_k d_k + \underline{n}, \qquad \text{Eq (4)}$$

where y is an (N+Δ)×1 vector of received samples at wireless device 120, and n is an (N+Δ)×1 vector of noise at wireless device 120.

In general, y may represent chip-rate samples from one receive antenna (as described above), over-sampled data (e.g., samples at twice chip rate, or chip×2), chip-rate samples from multiple receive antennas, or over-sampled data from multiple receive antennas. For simplicity, the noise may be assumed to be additive white Gaussian noise (AWGN) with a zero mean vector and a covariance matrix of $\sigma_n^2 I$, where $\sigma_n^2$ is the variance of the noise, and I is the identity matrix with ones along the diagonal and zeros elsewhere.

Wireless device 120 may recover one or more transmissions from one or more sectors using various signal recovery techniques including successive equalization and cancellation (SEC) and successive mini-MUD (SMM). These techniques may be applied on a (1) per sector basis to estimate and cancel the signal from one sector at a time or (2) per group basis to estimate and cancel the signal for one group of code channels/users at a time. For clarity, sector-based successive equalization and cancellation and group-based successive mini-MUD are described below.

1. Successive Equalization and Cancellation (SEC)

Sector-based successive equalization and cancellation processes the K sectors in a sequential order, one sector at a time, typically starting with the strongest sector and concluding with the weakest sector. The processing for each sector includes equalization, then data detection, and then signal reconstruction and cancellation. The processing for one sector s may be performed as follows.

Equalization is initially performed using minimum mean square error (MMSE), least squares (LS), or some other equalization technique. A equalizer matrix $M_{mmse,s}$ may be derived for sector s based on the MMSE technique, as follows:

$$M_{mmse,s} = [H_s^H H_s + \sigma_{v,s}^2 I]^{-1} H_s^H, \qquad \text{Eq (5)}$$

where $H_s$ is a channel response matrix for sector s, $\sigma_{v,s}^2$ is the variance of the total noise and interference for sector s, and "H" denotes a conjugate transpose.

$H_s$ may be estimated based on the pilot received from sector s.

A equalizer matrix $M_{ls,s}$ may also be derived for sector s based on the least squares technique, as follows:

$$M_{ls,s} = [H_s^H H_s]^{-1} H_s^H. \qquad \text{Eq (6)}$$

Equalization may be performed for sector s as follows:

$$\begin{aligned}
\hat{\underline{s}}_s &= \underline{M}_s \underline{y} \qquad \text{Eq (7)} \\
&= \underline{M}_s \left( \sum_{k=1}^{K} H_k A_k d_k + \underline{n} \right) \\
&= \underline{M}_s \left( H_s A_s d_s + \sum_{k=1, k \neq s}^{K} H_k A_k d_k + \underline{n} \right) \\
&= \underline{M}_s H_s A_s d_s + \underline{V}_s
\end{aligned}$$

where $M_s$ is an equalizer matrix for sector s, $V_s$ is a matrix of total noise and interference for sector s, and $\hat{s}_s$ is an equalized vector for sector s, which is an estimate of $s_s$.

Equalizer matrix $M_s$ may be derived using the MMSE or least squares technique.

Equation (7) may be approximated as follows:

$$\hat{s}_s \approx A_s d_s + V_s. \qquad \text{Eq (8)}$$

The total noise and interference matrix $V_s$ may be expressed as:

$$\underline{V}_s = M_s \sum_{k=1, k \neq s}^{K} H_k A_k d_k + n. \qquad \text{Eq (9)}$$

Equation (9) indicates that $V_s$ is colored by $M_s$, $H_k$ and $A_k$.

Data vector $d_s$ for sector s may be estimated based on equalized vector $\hat{s}_s$ using MMSE, least squares, or some other data detection technique. Data detection may be performed for sector s based on the MMSE technique, as follows:

$$\hat{d}_s = (A_s^H A_s + R_{vv,s})^{-1} A_s^H \hat{s}_s \qquad \text{Eq (10)}$$
$$= (\underline{G}_s^H \underline{W}^H \underline{C}_s^H \underline{C}_s \underline{W} \underline{G}_s + R_{vv,s})^{-1} A_s^H \hat{s}_s$$
$$= (N \underline{G}_s^H \underline{G}_s + R_{vv,s})^{-1} A_s^H \hat{s}_s$$

where $R_{vv,s}$ is a covariance matrix for total noise and interference matrix $V_s$, and $\hat{d}_s$ is a detected data vector for sector s, which is an estimate of $d_s$.

Gain matrix $G_s$ and covariance matrix $R_{vv,s}$ may be determined as described below.

The total noise and interference matrix $V_s$ may be approximated as white. Data vector $d_s$ may then be estimated as follows:

$$\hat{d}_s = (N \underline{G}_s^H \underline{G}_s + \text{diag}(R_{vv,s}))^{-1} A_s^H \hat{s}_s \qquad \text{Eq (11)}$$
$$= Z_{mmse,s} \hat{s}_s$$

where $Z_{mmse,s} = (N G_s^H G_s + \text{diag}(R_{vv,s}))^{-1} A_s^H$. $Z_s$ is an MMSE data detection filter for sector s with the approximation of $V_s$ as white. Since $(N G_m^H G_m + \text{diag}(R_{vv,i,m}))$ is a diagonal matrix, the inverse operation becomes simple scalar inversion.

Data detection may also be performed for sector s based on the least squares technique, as follows:

$$\hat{d}_s = (A_s^H A_s)^{-1} A_s^H \hat{s}_s, \qquad \text{Eq (12)}$$

where $(A_s^H A_s)^{-1} A_s^H$ is a least squares data detection filter for sector s.

Data detection may also be performed for sector s based on a matched filter technique, as follows:

$$\hat{d}_s = A_s^H \hat{s}_s, \qquad \text{Eq (13)}$$

where $A_s^H$ is a matched data detection filter for sector s.

The signal for sector s may be reconstructed as follows:

$$\hat{x}_s = H_s A_s \hat{d}_s, \qquad \text{Eq (14)}$$

where $\hat{x}_s$ is a reconstructed signal vector for sector s, which is an estimate of $x_s$.

Reconstructed signal vector $\hat{x}_s$ may be subtracted from received vector y to obtain a received vector for the next sector, as follows:

$$y_s = y - \hat{x}_s, \qquad \text{Eq (15)}$$

where $y_s$ is a received vector with the signal from sector s removed.

The description above for equations (5) through (15) is for equalization and cancellation for one sector s. The same processing may be performed successively for K sectors. The received power for each sector may be estimated, e.g., based on the pilot received from the sector. The K sectors may be sorted from strongest sector to weakest sector. Successive equalization and cancellation may then be performed for one sector at a time, starting with the strongest sector.

Figure 4:
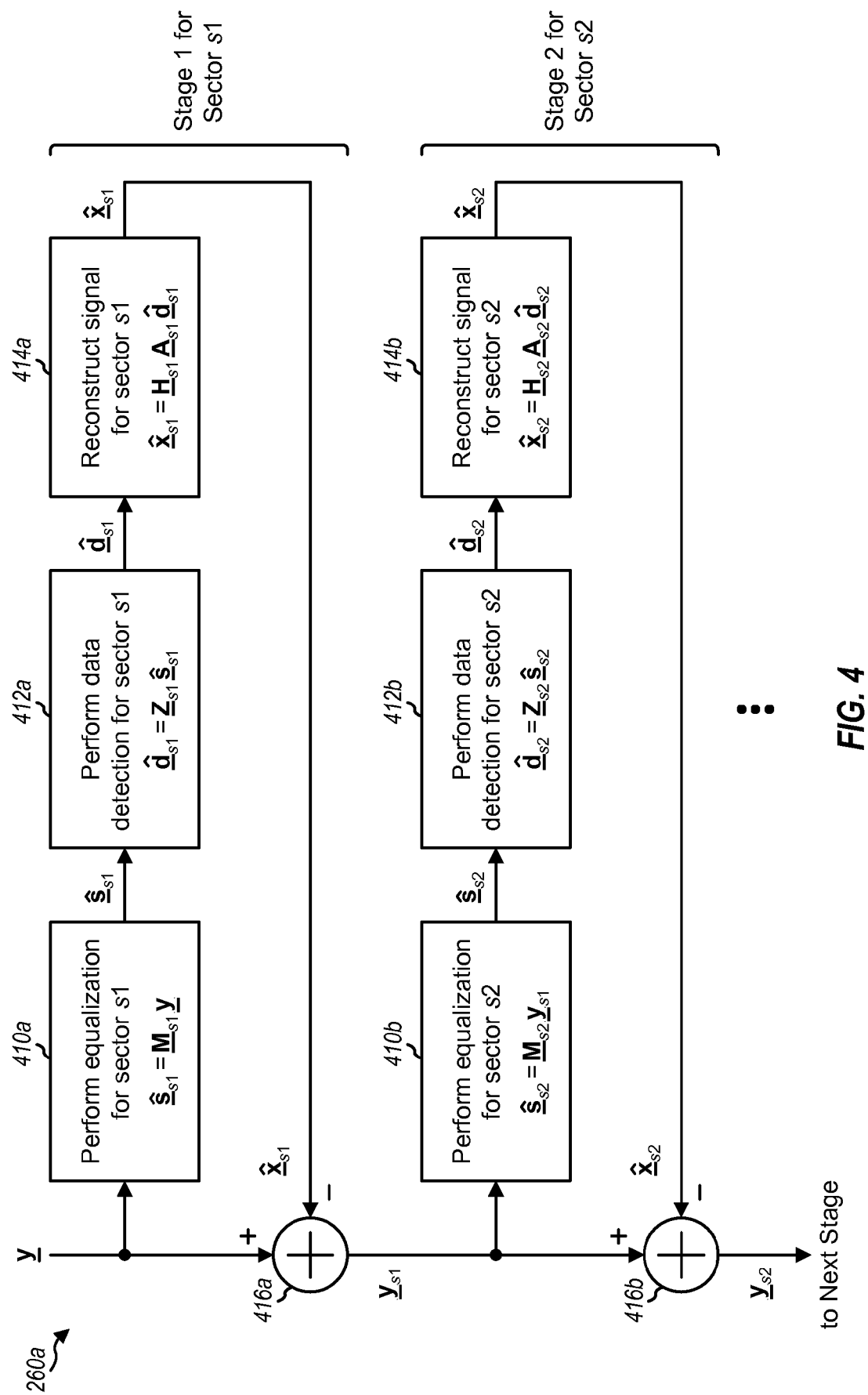
FIG. 4 shows successive equalization and cancellation.

FIG. 4 shows a block diagram of a processor 260a for successive equalization and cancellation, which is an embodiment of processor 260 in FIG. 2. A first sector s1 to be processed in the first stage may be the strongest received sector. A block 410a performs equalization on received vector y with an equalizer matrix $M_{s1}$ for sector s1 and provides an equalized vector $\hat{s}_{s1}$ for sector s1, e.g., as shown in equation (7). A block 412a performs data detection on equalized vector $\hat{s}_{s1}$ with a data detection matrix $Z_{s1}$ for sector s1 and provides a detected data vector $\hat{d}_{s1}$ for sector s1, e.g., as shown in equation (11), (12) or (13). A block 414a reconstructs the signal for sector s1 based on $\hat{d}_{s1}$ and provides a reconstructed signal vector $\hat{x}_{s1}$ for sector s1, e.g., as shown in equation (14). A summer 416a subtracts reconstructed signal vector $\hat{x}_{s1}$ from received vector y, as shown in equation (15), and provides a modified received vector $y_{s1}$ for the next stage.

A second sector s2 to be processed in the second stage may be the second strongest received sector. A block 410b performs equalization on modified received vector $y_{s1}$ with an equalizer matrix $M_{s2}$ for sector s2 and provides an equalized vector $\hat{s}_{s2}$. A block 412b performs data detection on equalized vector $\hat{s}_{s2}$ with a data detection matrix $Z_{s2}$ for sector s2 and provides a detected data vector $\hat{d}_{s2}$. A block 414b reconstructs the signal for sector s2 based on $\hat{d}_{s2}$ and provides a reconstructed signal vector $\hat{x}_{s2}$. A summer 416b subtracts reconstructed signal vector $\hat{x}_{s2}$ from modified received vector $y_{s1}$ and provides a modified received vector $y_{s2}$ for the next stage. The processing for each subsequent sector may proceed in similar manner.

The sectors may be processed sequentially from the strongest sector to the weakest sector. This may improve detection performance for each sector since the signals from stronger sectors (if any) have been canceled. The sectors may also be processed in other orders. In general, the sequential processing of the sectors may result in the received signal quality progressively improving for each subsequently processed sector, since the interfering signals from earlier processed sectors have been removed.

The wireless device may desire to recover a signal from a single sector. In an embodiment, this sector is processed in the last stage after canceling the signals from other sectors. In another embodiment, the K sectors are processed from strongest to weakest, as described above. If the desired sector is not the last sector that is processed, then reconstructed signal vector $\hat{x}_s$ for the desired sector may be added back to modified received vector $y_{sK}$ from the last stage, or $\tilde{y}_s = y_{sK} + \hat{x}_s$. Vector $\tilde{y}_s$ would then contain the signal from the desired sector and would have the signals from all other sectors removed. Vector $\tilde{y}$ may then be processed to detect the desired signal.

The wireless device may desire to recover signals from multiple sectors, e.g., for soft handoff. In an embodiment, these sectors are processed in the last few stages after canceling the signals from other sectors. In another embodiment, the K sectors are processed from strongest to weakest, as described above. For each desired sector, the reconstructed signal vector for that sector may be added back to modified received vector $y_{sK}$ from the last stage, and the resultant vector may be processed to recover the signal from that sector.

In equation (11), covariance matrix $R_{vv,s}$ may be estimated as follows. Equation (7) may be rewritten as:

$$\hat{s}_s = B_s + V_s, \qquad \text{Eq (16)}$$

where $B_s = M_s H_s A_s d_s$. The covariance of $\hat{s}_s$, $B_s$ and $V_s$ may be expressed as:

$$R_{ss} = R_{bb,s} + R_{vv,s}. \qquad \text{Eq (17)}$$

The covariance of $\hat{s}_s$ may be expressed as:

$$R_{ss} = E\{\hat{s}_s \hat{s}_s^H\}, \qquad \text{Eq (18)}$$

where $E\{\ \}$ denotes an expectation operation. $R_{ss}$ may be estimated by computing the outer product of $\hat{s}_s$ and averaging over multiple symbol periods.

The covariance of $B_s$ may be estimated as:

$$R_{bb,s} = E\{M_s H_s A_s A_s^H M_s^H\}. \qquad \text{Eq (19)}$$

$A_s$, $H_s$ and $M_s$ may be estimated and used to derive $R_{bb,s}$.

The covariance of $V_s$ may then be expressed as:

$$R_{vv,s} = E\{V_s V_s^H\} = R_{ss} - R_{bb,s}. \qquad \text{Eq (20)}$$

Gain matrix $G_s$ may be estimated by performing channel matched filtering followed by PN descrambling and Walsh despreading as follows.

$$\begin{aligned} \underline{q}_s &= \underline{W}^H \underline{C}_s^H \underline{H}_s^H \underline{y} \qquad \text{Eq (21)} \\ &= \underline{W}^H \underline{C}_s^H \underline{H}_s^H \Bigg( \underline{H}_s \underline{C}_s \underline{W} \underline{G}_s \underline{d}_s + \\ &\qquad \sum_{k=1, k \neq s}^{K} \underline{H}_k \underline{C}_k \underline{W} \underline{G}_k \underline{d}_k + \underline{n} \Bigg) \\ &= \underline{\Omega}_s \underline{G}_s \underline{d}_s + \underline{v}_s \end{aligned}$$

where $\Omega_s = W^H C_s^H H_s C_s W$, $v_s$ is a vector of noise and interference for sector s, and $q_s$ is a vector of decovered symbols for sector s.

The variance of the elements of $q_s$ may be expressed as:

$$E\{|q_{s,n}|^2\} = |\alpha_{s,n}|^2 g_{s,n}^2 + \sigma_{v,s}^2, \qquad \text{Eq (22)}$$

where $q_{s,n}$ is the n-th element of q, $\alpha_{s,n}$ and $g_{s,n}$ are the n-th diagonal elements of $\Omega_s$ and $G_s$, respectively, and $\sigma_{v,s}^2$ is the variance of $v_s$.

The mean square operation in equation (22) removes the data symbols in $d_s$, which are assumed to be uncorrelated.

The noise and interference variance $\sigma_{v,s}^2$ may be estimated by taking the difference of $e_{s,0}$ for the pilot channel for consecutive symbol periods, computing the squared magnitude of the difference, and filtering the squared magnitude to obtain the estimate of $\sigma_{v,s}^2$. The estimated $\sigma_{v,s}^2$ may then be subtracted from $E\{|q_{s,n}|^2\}$ to obtain an estimate of $|\alpha_{s,n}|^2 g_{s,n}^2$, as follows:

$$G_{s,n} = E\{|g_{s,n}|^2\} - \sigma_{v,s}^2 = |\alpha_{s,n}|^2 g_{s,n}^2, \qquad \text{Eq (23)}$$

where $G_{s,n}$ is a scaled power gain for code channel n.

Scaled gains for the code channels may then be derived as follows:

$$\frac{g_{s,n}}{g_{s,pilot}} = \sqrt{\frac{G_{s,n}}{G_{s,pilot}}}, \qquad \text{Eq (24)}$$

where $g_{s,pilot}$ and $G_{s,pilot}$ are the gain and the power gain, respectively, of the pilot channel for sector s.

In equation (24), the gains of the code channels are given relative to the gain $g_{s,pilot}$ of the pilot channel. This is a desired form since the channel response matrix $H_s$ is also derived based on the pilot and includes the gain $g_{s,pilot}$ of the pilot channel, which would be canceled by the scaled gains from equation (24).

Figure 5:
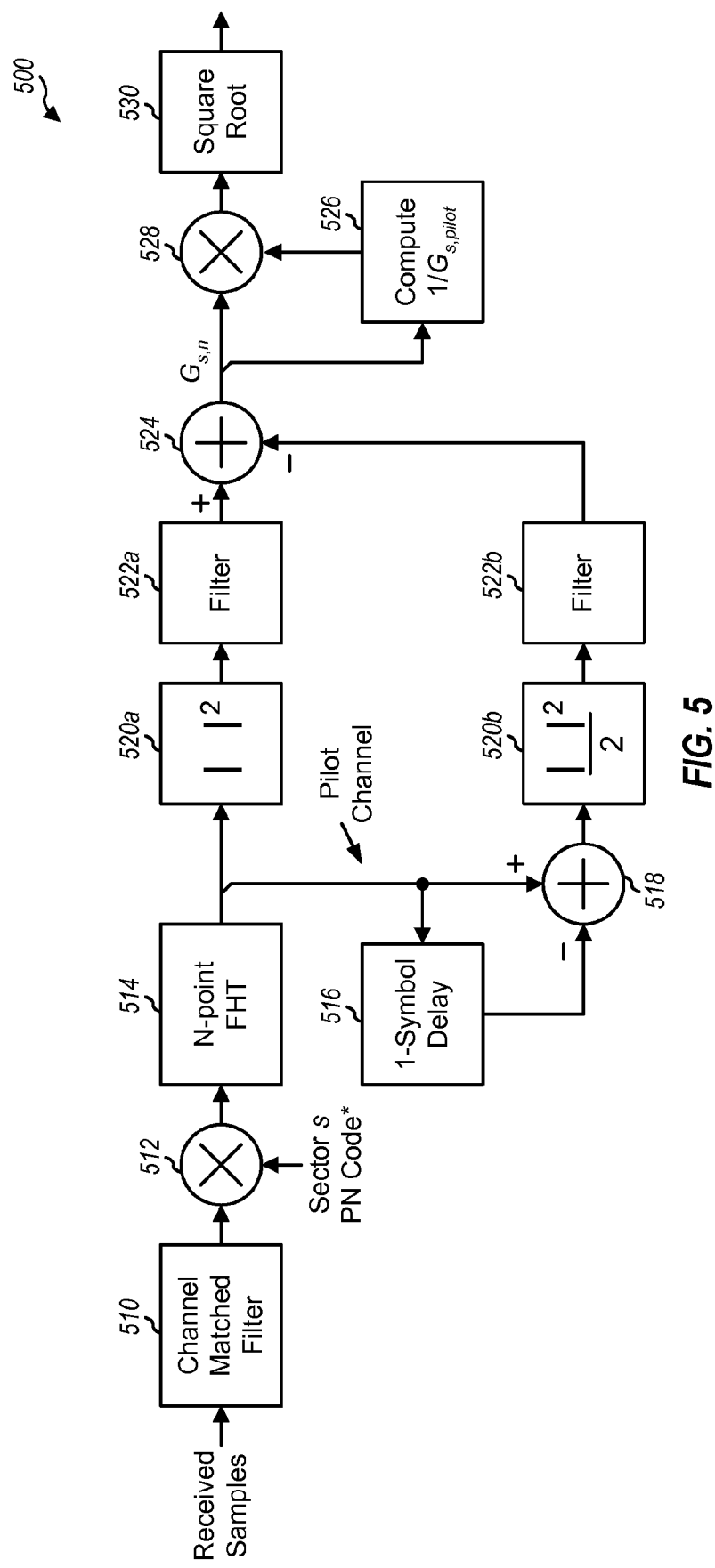
FIG. 5 shows a block diagram of a code channel gain estimation unit.

FIG. 5 shows a block diagram of a code channel gain estimation unit 500. FIG. 5 shows the processing to estimate the gains of the N code channels for one sector s. Within gain estimation unit 500, a unit 510 performs channel matched filtering and multiplies the received samples in y with the complex conjugated channel gains in $H_s$ for sector s. A multiplier 512 multiplies the output of unit 510 with the complex conjugated PN chips for sector s and provides despread samples. A unit 514 performs an N-point fast Hadamard transform (FHT) on N despread samples for each symbol period and provides N decovered symbols for N code channels, which are the N elements of $q_s$. Unit 514 efficiently performs Walsh decovering for all N code channels.

A unit 520a computes the squared magnitude of the decovered symbol for each code channel. A filter 522a filters the output of unit 520a for each code channel. The output of filter 522a is an estimate of the expected value in equation (22).

The noise and interference variance is estimated based on the decovered symbols for the pilot channel. A unit 516 provides one symbol period of delay for each decovered symbol for the pilot channel. A summer 518 subtracts the delayed decovered symbol from the current decovered symbol and provides the difference. Since the pilot symbol is constant, taking the difference removes the pilot modulation while capturing the noise and interference, which are assumed to be random from symbol period to symbol period. A unit 520b computes the squared magnitude of the difference from summer 518 and further divides the result by two to account for the difference operation by summer 518. A filter 522b filters the output of unit 520b and provides the estimated noise and interference variance $\sigma_{v,s}^2$.

A unit 524 subtracts the noise and interference variance from the output of filter 522a and provides the scaled power gain $G_{s,n}$ for each code channel. A unit 526 determines a scaling factor $1/G_{s,pilot}$ based on the scaled power gain $G_{s,pilot}$ for the pilot channel. A multiplier 528 multiplies the scaled power gain for each code channel with the scaling factor and provides $G_{s,n}/G_{s,pilot}$ for each code channel. A unit 530 computes the square root of $G_{s,n}/G_{s,pilot}$ for each code channel and provides the scaled gain $g_{s,n}/g_{s,pilot}$ for that code channel.

The received power for each code channel may be determined based on the scaled gain $g_{s,n}$ for that code channel and the received power for sector s, as follows:

$$P_{s,n} = \left( \frac{g_{s,n}}{g_{s,pilot}} \right)^2 P_{s,pilot}, \qquad \text{Eq (25)}$$

where $P_{s,pilot}$ is the received pilot power for sector s, and $P_{s,n}$ is the received power for code channel n of sector s.

The received powers for the code channels may be used to sort users into groups, as described below.

Figure 6:
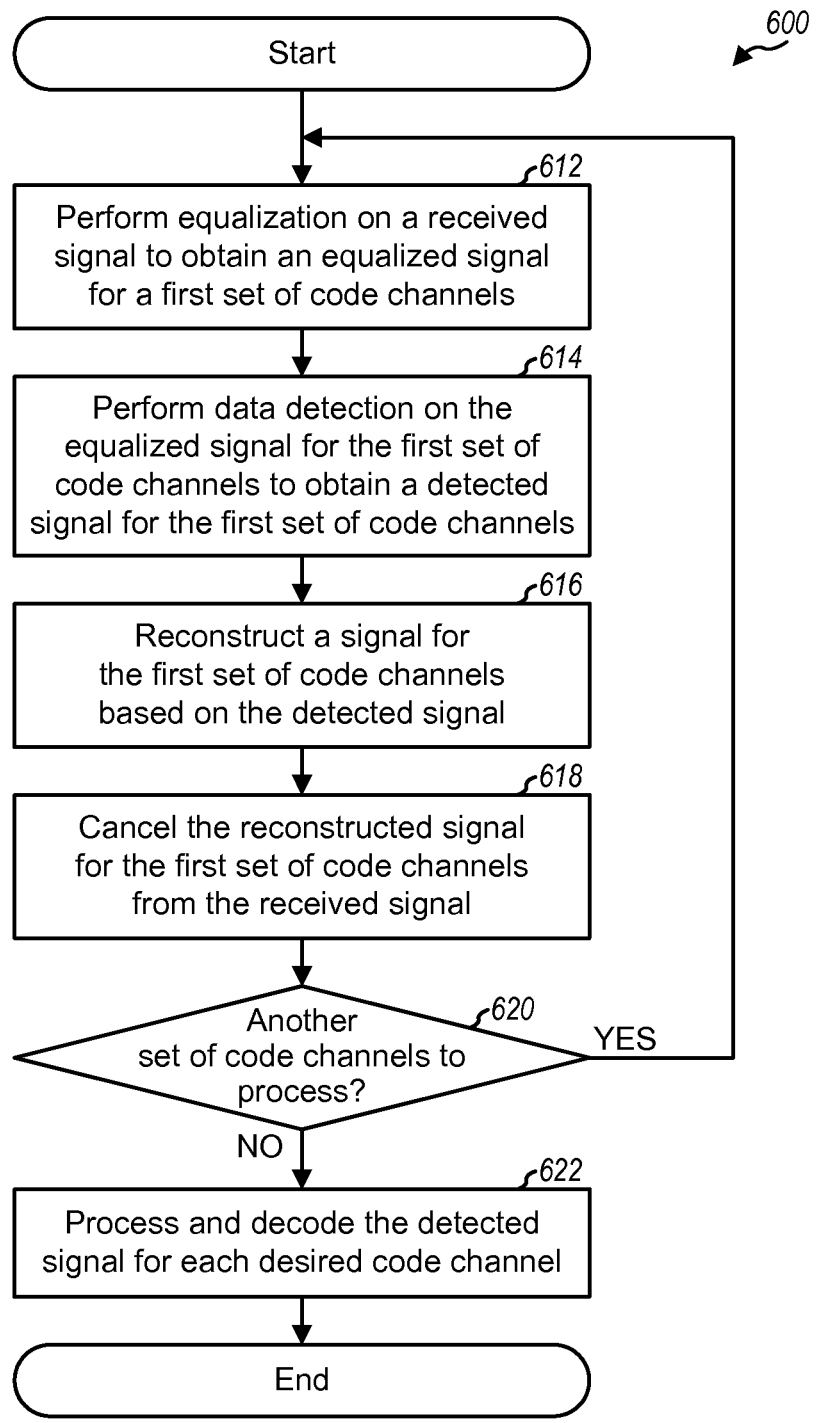
FIG. 6 shows a process for performing successive equalization and cancellation.

FIG. 6 shows an embodiment of a process 600 for performing successive equalization and cancellation. Equalization is performed on a received signal (e.g., y) to obtain an equalized signal (e.g., $\hat{s}_s$) for a first set of code channels (block 612). The first set may include all code channels for one sector, a subset of all code channels for one sector, multiple code channels for multiple sectors, etc. Data detection is then performed on the equalized signal for the first set of code channels to obtain a detected signal (e.g., $\hat{d}_s$) for the first set of code channels (block 614). A signal for the first set of code channels is reconstructed based on the detected signal (block 616). The reconstructed signal (e.g., $\hat{x}_s$) for the first set of code channels is canceled from the received signal (block 618). Each signal may comprise samples, symbols, chips, etc.

Equalization, data detection, reconstruction, and cancellation are performed for at least one additional set of code channels in similar manner. A determination is made when there is another set of code channels to process (block 620). If the answer is 'Yes', then the process returns to block 612 to process the next set of code channel. Otherwise, the detected signal for each desired code channel is processed and decoded (block 622). Although not shown in FIG. 6 for simplicity, if the desired code channel is in a set that has been canceled (e.g., the first set), then the reconstructed signal for that set may be added back, and equalization and data detection may be performed again to obtain a more reliable detected signal for the desired code channel.

The received powers of the code channels for all sectors to be processed may be determined. Multiple sets of code channels may be formed based on the received powers. The first set may include code channels with the strongest received powers. Each remaining set may include code channels with progressively lower received powers. Equalization, data detection, reconstruction, and cancellation may be performed sequentially for the multiple sets of code channels, one set at a time, starting with the first set having the strongest received powers.

For equalization, an equalizer matrix (e.g., $M_s$) for a set of code channels may be derived in accordance with the MMSE or least squares technique. Equalization may then be performed on the received signal with the equalizer matrix. For data detection, a gain matrix (e.g., $G_s$) and the covariance of noise and interference (e.g., $R_{vv,s}$) for a set of code channels may be estimated and used to derive a data detection filter (e.g., $Z_s$). Data detection may then be performed for the set of code channels with the data detection filter.

2. Successive Mini-MUD (SMM)

For successive mini-MUD, the users in the K sectors (or the code channels for the K sectors) are arranged into M groups, where M may be any integer value. Each group may contain a predetermined number of users, e.g., L users, where L may be any integer value. The users may be arranged in various manners.

In an embodiment, which is referred to as sector-based SMM, each group includes all users in one sector. In this embodiment, M user groups may be formed, with each user group containing L users in one sector, where M=K and L=N. The K sectors may be sorted from strongest to weakest. The first group may contain all users in the strongest sector, the second group may contain all users in the next strongest sector, and so on, and the last group may contain all users in the weakest sector.

In another embodiment, which is referred to as global SMM, the received powers for all users in all sectors are estimated, e.g., as described above for equations (21) through (25). The users are then sorted from strongest to weakest and stored in a list. The first group may contain the L strongest users in the list, the second group may contain the L next strongest users, and so on, and the last group may contain the L weakest users in the list. As an example, there may be 40 total users in three sectors. The users may be arranged into groups of four users. The first group may contain the four strongest users, the second group may contain the next four strongest users, and so on, and the tenth group may contain the four weakest users. In this embodiment, a given group may contain users in the same sector or different sectors.

In yet another embodiment, which is referred to as local SMM, each group contains a subset of the users in one sector. The users may be sorted based on their received powers as described above for global SMM. The first group may contain the L strongest user in the list for the same sector, the second group may contain the next L strongest remaining users in the list for the same sector, and so on. Alternatively, the groups may be formed for one sector at a time, starting with the strongest sector. The first group may contain the L strongest users in the strongest sector, the second group may contain the L next strongest users in the strongest sector, and so on, and the last group may contain the L weakest users in the weakest sector. As an example, there may be 40 total users in three sectors, with the strongest sector 1 including 20 users, the next strongest sector 2 including 12 users, and the weakest sector 3 including 8 users. The users may be arranged into groups of four users. The first group may contain the four strongest users in sector 1, the second group may contain the next four strongest users in sector 1, and so on, and the tenth group may contain the four weakest users in sector 3.

The received signal for user group m, without noise, may be expressed as:

$$x_m = H_m C_m W_m G_m d_m = T_m d_m, \qquad \text{Eq (26)}$$

where $d_m$ is an L×1 data vector for the L users in group m,
$G_m$ is an L×L gain matrix for the users in group m,
$W_m$ is an N×L matrix of Walsh codes for the users in group m,
$C_m$ is an N×N PN matrix for the users in group m
$H_m$ is an (N+Δ)×N channel response matrix for the users in group m,
$T_m$ is an (N+Δ)×L system matrix for data vector $d_m$, and
$x_m$ is an (N+Δ)×1 vector of received samples for user group m.

Vector $d_m$ and matrices $G_m$ and $W_m$ contain the data symbols, the gains, and the Walsh codes, respectively, for the users in group m. These users may belong in the same sector or different sectors. Matrix $W_m$ may contain duplicate columns if multiple users in group m are assigned code channels with the same Walsh code. $C_m$ contains PN chips for all sectors transmitting to the users in group m. $H_m$ contains channel gains for the users in group m. If the users in group m belong in one sector, then $C_m$ and $H_m$ contain PN chips and channel gains for one sector. If the users in group m belong in multiple sectors, then $C_m$ and $H_m$ are block diagonal matrices containing PN chips and channel gains for these multiple sectors, one diagonal channel gain matrix and one diagonal PN matrix for each sector. $x_m$ contains the received samples for all users in group m in the absence of noise.

The system matrix for user group m may be given as:

$$T_m = H_m C_m W_m G_m, \qquad \text{Eq (27)}$$

System matrix $T_m$ represents all of the processing as well as the channel response observed by data vector $d_m$. The height of $T_m$ is related to time (in number of chips), and the width of $T_m$ is determined by the number of users. A single system matrix T may be defined for all M·L users in all K sectors. However, the processing for this single large system matrix T would be computationally intensive.

The received samples at wireless device 120 for the M user groups may be expressed as:

$$\underline{y} = \sum_{m=1}^{M} \underline{x}_m + \underline{n} = \sum_{m=1}^{M} T_m \underline{d}_m + \underline{n}. \qquad \text{Eq (28)}$$

Successive mini-MUD processes the M user groups in a sequential order, one group at a time, typically starting with the strongest group and concluding with the weakest group. The processing for one user group g may be performed as follows. For user group g, equation (28) may be rewritten as follows:

$$\underline{y} = T_g \underline{d}_g + \underline{v}_g, \text{ and} \qquad \text{Eq (29)}$$

$$\underline{v}_g = \sum_{m=1, m \ne g}^{M} T_m d_m + \underline{n}, \qquad \text{Eq (30)}$$

where $v_g$ is the total noise and interference for user group g.

Data vector $d_g$ for user group g may be estimated based on received vector y and using MMSE, least squares, or some other data detection technique. Data detection may be performed for user group g based on the MMSE technique, as follows:

$$\hat{d}_g = R_{dd,g} T_g^H (T_g R_{dd,g} T_g^H + R_{vv,g})^{-1} y, \qquad \text{Eq (31)}$$

where $R_{dd,g} = E\{d_g d_g^H\}$ is the covariance of data vector $d_g$ for user group g, and $R_{vv,g} = E\{v_g V_g^H\}$ is the covariance of total noise and interference vector $v_g$.

$\hat{d}_g$ is a detected data vector for user group g, which is an estimate of $d_g$. The data symbols in $d_g$ may be assumed to be uncorrelated so that $R_{dd,g} = I$. The noise and interference may be assumed to be AWGN so that $R_{vv,g} = \sigma_{v,g}^2 I$, where $\sigma_{v,g}^2$ is the variance of the noise and interference for user group g, which may be estimated as described above for equations (21) through (25).

Equation (31) may then be expressed as:

$$\hat{d}_g = (T_g^H T_g + \sigma_{v,g}^2 I)^{-1} T_g^H \underline{y} \qquad \text{Eq (32)}$$
$$= Z_{mmse,g} \underline{y}$$

where $Z_{mmse,g} = (T_g^H T_g + \sigma_{v,g}^2 I)^{-1} T_g^H$ is an MMSE data detection filter for user group g. Equation (32) is derived from equation (31) using the matrix inverse lemma and the assumptions for $R_{dd,g}$ and $R_{vv,g}$ described above.

Data detection may also be performed for user group g based on the least squares technique, as follows:

$$\hat{d}_g = (T_g^H T_g)^{-1} T_g^H \underline{y} \qquad \text{Eq (33)}$$
$$= Z_{ls,g} \underline{y}$$

where $Z_{ls,g} = (T_g^H T_g)^{-1} T_g^H$ is a least squares data detection filter for user group g.

The signal for user group g may be reconstructed as follows:

$$\hat{x}_g = T_g \hat{d}_g, \qquad \text{Eq (34)}$$

where $\hat{x}_g$ is a reconstructed signal vector for user group g, which is an estimate of $x_g$.

Reconstructed signal vector $\hat{x}_g$ may be subtracted from received vector y to obtain a modified received vector for the next user group, as follows:

$$y_g = y - \hat{x}_g, \qquad \text{Eq (35)}$$

where $y_g$ is a modified received vector with the signal from user group g canceled.

The description above for equations (29) through (35) is for one user group g. The same processing may be performed successively for the M user groups, one user group at a time, e.g., starting with the strongest user group.

Figure 7:
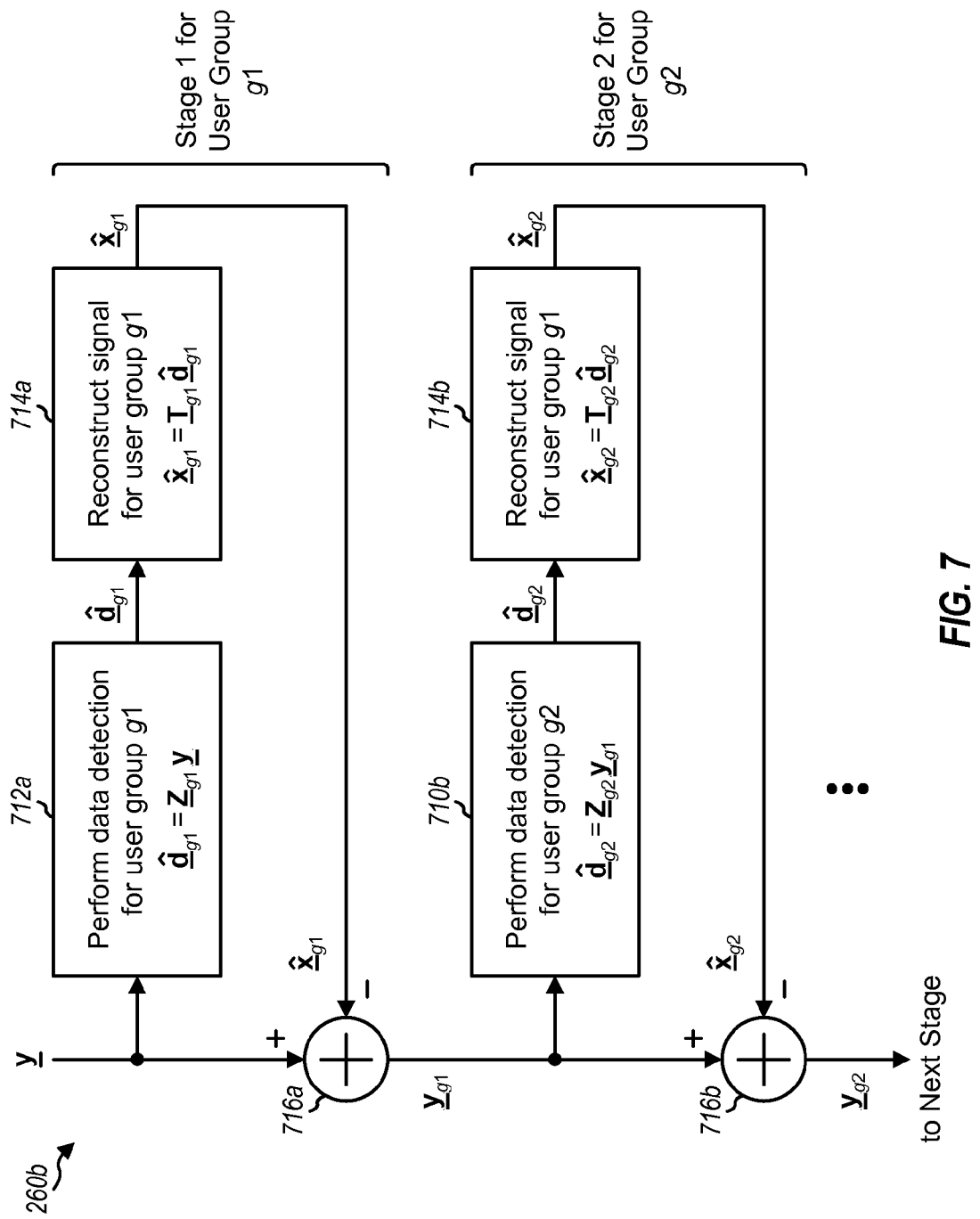
FIG. 7 shows successive mini-MUD.

FIG. 7 shows a block diagram of a processor 260b for successive mini-MUD, which is another embodiment of processor 260 in FIG. 2. A first user group g1 to be processed in the first stage may be the strongest user group. A block 712a performs data detection on received vector y with a data detection matrix $Z_{g1}$ for user group g1 and provides a detected data vector $\hat{d}_{g1}$ for user group g1. A data detection matrix $Z_{g1}$ may be derived based on the MMSE technique as shown in equation (32) or the least squares technique as shown in equation (33). A block 714a reconstructs the signal for user group g1 based on $\hat{d}_{g1}$ and provides a reconstructed signal vector $\hat{x}_{g1}$ for user group g1, e.g., as shown in equation (34). A summer 716a subtracts reconstructed signal vector $\hat{x}_{g1}$ from received vector y, as shown in equation (35), and provides a modified received vector $y_{g1}$ for the next stage.

A second user group g2 to be processed in the second stage may be the second strongest user group. A block 712b performs data detection on modified received vector $y_{g1}$ with a data detection matrix $Z_{g2}$ for user group s2 and provides a detected data vector $\hat{d}_{g2}$. A block 714b reconstructs the signal for user group g2 based on $\hat{d}_{g2}$ and provides a reconstructed signal vector $\hat{x}_{g2}$. A summer 716b subtracts reconstructed signal vector $\hat{x}_{g2}$ from modified received vector $y_{g1}$ and provides a modified received vector $y_{g2}$ for the next stage. The processing for each subsequent user group may proceed in similar manner.

The M user groups may be processed sequentially from the strongest user group to the weakest user group. This may improve detection performance for each user group since the signals from stronger user groups (if any) have been canceled. The user groups may also be processed in other orders. In general, the sequential processing of the user groups may result in the received signal quality progressively improving for each subsequently processed user group, since the interfering signals from earlier processed user groups have been removed.

The wireless device may desire to recover a signal from a single sector. In an embodiment, the desired user group for this sector is processed in the last stage after canceling the signals from other user groups. In another embodiment, the M user groups are processed from strongest to weakest, as described above. If the desired user group is not the last user group that is processed, then reconstructed signal vector $\hat{x}_g$ for the desired user group may be added back to modified received vector $y_{gK}$ from the last stage, or $\tilde{y} = y_{gK} + \hat{x}_g$. Vector $\tilde{y}_g$ would then contain the signal from the desired user group and would have the signals from all other user groups removed. Vector $\tilde{y}_g$ may then be detected to obtain the desired signal.

The wireless device may desire to recover signals from multiple sectors, e.g., for soft handoff. In an embodiment, the desired user groups for these sectors are processed in the last few stages after canceling the signals from other user groups. In another embodiment, the M user groups are processed from strongest to weakest, as described above. For each desired user group, the reconstructed signal vector for that user group may be added back to modified received vector $\tilde{y}_{gK}$ from the last stage, and the resultant vector may be processed to recover the signal from that user group.

Successive mini-MUD performs processing for a group of users at a time, instead of all users. Successive mini-MUD may have certain advantages. First, the size of the matrix to be inverted in equation (32) may be much smaller than the size of the matrix to be inverted if all users are processed concurrently for full MUD. Second, the successive processing of the M user groups may result in the received signal quality progressively improving for each subsequently processed user group.

Figure 8:
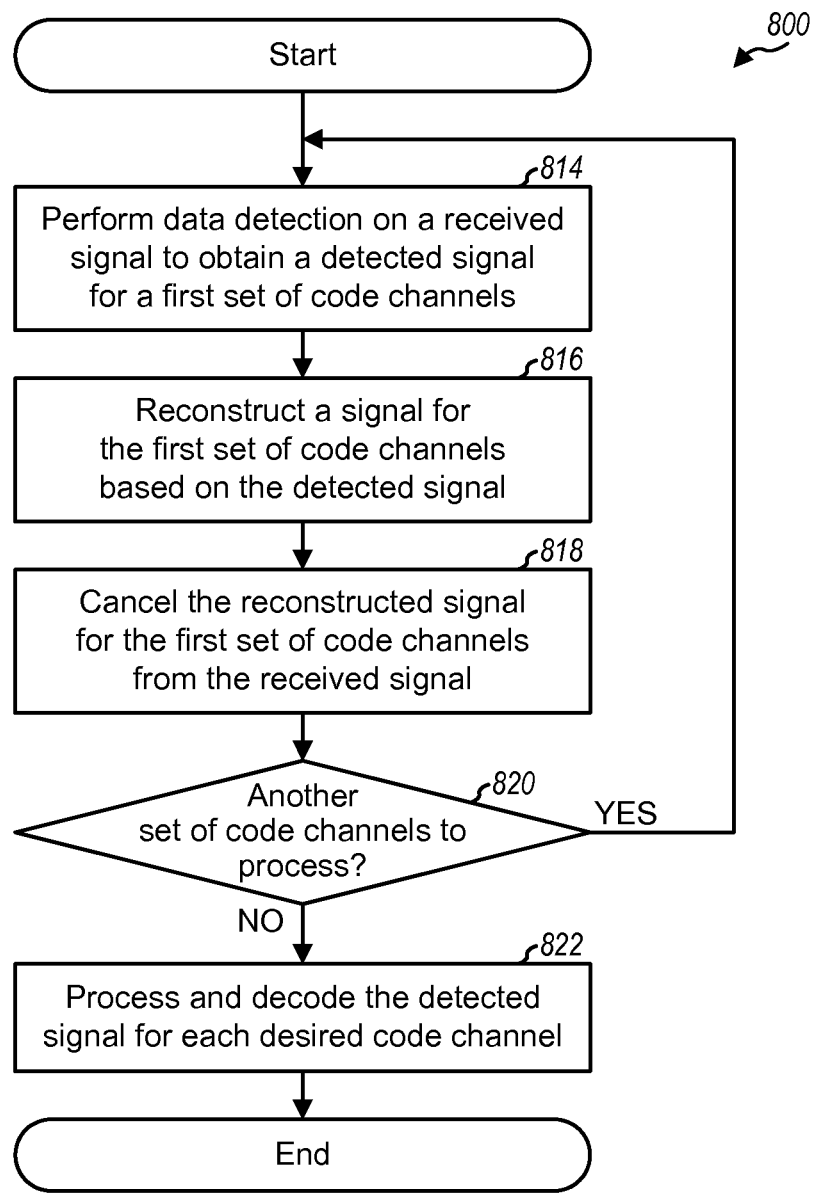
FIG. 8 shows a process for performing successive mini-MUD.

FIG. 8 shows an embodiment of a process 800 for performing successive mini-MUD. Data detection is performed on a received signal (e.g., y) to obtain a detected signal (e.g., $\hat{d}_g$) for a first set of code channels (block 814). The first set may include all code channels for one sector, a subset of all code channels for one sector, multiple code channels for multiple sectors, etc. A signal for the first set of code channels is reconstructed based on the detected signal (block 816). The reconstructed signal (e.g., $\hat{x}_g$) for the first set of code channels is canceled from the received signal (block 818).

Data detection, reconstruction, and cancellation are performed for at least one additional set of code channels in similar manner. A determination is made when there is another set of code channels to process (block 820). If the answer is 'Yes', then the process returns to block 814 to process the next set of code channels. Otherwise, the detected signal for each desired code channel is processed and decoded (block 822). Although not shown in FIG. 8 for simplicity, if the desired code channel is in a set that has been canceled (e.g., the first set), then the reconstructed signal for that set may be added back, and data detection may be performed again to obtain a more reliable detected signal for the desired code channel.

The received powers of the code channels for all sectors to be processed may be determined. Multiple sets of code channels may be formed based on the received powers. The first set may include code channels with strongest received powers. Each remaining set may include code channels with progressively lower received powers. Data detection, reconstruction, and cancellation may be performed sequentially for the multiple sets of code channels, one set at a time, starting with the first set having the strongest received powers.

For data detection, a system matrix (e.g., $T_g$) and possibly noise and interference variance (e.g., $\sigma_{v,g}^2$) for a set of code channels may be estimated. A data detection filter (e.g., $Z_g$) may be derived based on the system matrix and possibly the noise and interference variance and in accordance with the MMSE or least squares technique. Data detection may then be performed for the set of code channels with the data detection filter.

One or more iterations may be performed for both successive equalization and cancellation (SEC) and successive mini-MUD. Each iteration may sequentially process all sectors or user groups. The result from the last sector or user group in one iteration may be passed to the next iteration. Cycling through the cancellation of sectors or user groups multiple times may improve cancellation and provide better performance.

The techniques described herein may be implemented by various means. For example, these techniques may be implemented in hardware, firmware, software, or a combination thereof. For a hardware implementation, the processing units used to perform the processing described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 292 in FIG. 2) and executed by a processor (e.g., processor 290). The memory may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus comprising:
at least one processor configured according to executable instructions to perform equalization on a received signal to obtain an equalized signal for a first set of code channels for one sector, to perform data detection on the equalized signal to obtain a detected signal for the first set of code channels, to perform reconstruction on the detected signal to obtain a reconstructed signal for the first set of code channels, to perform cancellation on the reconstructed signal for the first set of code channels from the received signal to obtain a modified received signal from the one sector, and to perform equalization, data detection, reconstruction, and cancellation for at least one additional set of code channels for another sector on the modified received signal from the one sector to obtain a modified received signal from the another sector and using the modified received signal from the another sector to determine a desired signal; and
a memory configured to store the executable instructions and coupled to the at least one processor.

2. The apparatus of claim 1, wherein the at least one processor is further configured to form multiple sets of code channels comprising the first set and the at least one additional set, and to perform equalization, data detection, reconstruction, and cancellation sequentially for the multiple sets of code channels, one set of code channels at a time.

3. The apparatus of claim 1, wherein the at least one processor is further configured to determine received powers of a plurality of code channels for at least one sector, to form multiple sets of code channels based on the received powers, the multiple sets comprising the first set and the at least one additional set, the first set including code channels with strongest received powers, and to perform equalization, data detection, reconstruction, and cancellation sequentially for the multiple sets of code channels, one set of code channels at a time, starting with the first set having the strongest received powers.

4. The apparatus of claim 1, wherein the at least one processor is further configured to derive an equalizer matrix for the first set of code channels and to perform equalization on the received signal with the equalizer matrix.

5. The apparatus of claim 4, wherein the at least one processor is further configured to derive the equalizer matrix in accordance with minimum mean square error (MMSE) or least squares (LS) technique.

6. The apparatus of claim 1, wherein the at least one processor is further configured to estimate a gain matrix for the first set of code channels, to derive a data detection filter for the first set of code channels based on the gain matrix, and to perform data detection on the equalized signal with the data detection filter.

7. The apparatus of claim 6, wherein the at least one processor is further configured to estimate covariance of noise and interference for the first set of code channels, and to derive the data detection filter further based on the covariance of the noise and interference.

8. The apparatus of claim 6, wherein the at least one processor is further configured to obtain decovered symbols for the code channels in the first set, to determine an averaged squared magnitude of the decovered symbols for each code channel in the first set, and to determine a gain for each code channel in the first set based on the averaged squared magnitude of the decovered symbols for the code channel.

9. The apparatus of claim 8, wherein the at least one processor is further configured to estimate variance of noise and interference based on decovered symbols for a pilot channel, and to determine the gain for each code channel further based on the variance of the noise and interference.

10. The apparatus of claim 1, wherein the first set includes a subset of all code channels for one sector.

11. The apparatus of claim 1, wherein the first set includes all code channels for one sector.

12. The apparatus of claim 1, wherein the first set includes multiple code channels for multiple sectors.

13. A method comprising:
performing equalization on a received signal to obtain an equalized signal for a first set of code channels for one sector;
performing data detection on the equalized signal to obtain a detected signal for the first set of code channels;
performing reconstruction on the detected signal to obtain a reconstructed signal for the first set of code channels;
performing cancellation on the reconstructed signal for the first set of code channels from the received signal to obtain a modified received signal from the one sector; and
performing equalization, data detection, reconstruction, and cancellation for at least one additional set of code channels for another sector on the modified received signal from the one sector to obtain a modified received signal from the another sector and using the modified received signal from the another sector to determine a desired signal.

14. The method of claim 13, further comprising:
determining received powers of a plurality of code channels for at least one sector; and
forming multiple sets of code channels based on the received powers, the multiple sets comprising the first set and the at least one additional set, the first set including code channels with strongest received powers, and
wherein equalization, data detection, reconstruction, and cancellation are performed sequentially for the multiple sets of code channels, one set of code channels at a time, starting with the first set having the strongest received powers.

15. The method of claim 13, wherein the performing equalization comprises
deriving an equalizer matrix for the first set of code channels, and
performing equalization on the received signal with the equalizer matrix.

16. The method of claim 13, wherein the performing data detection comprises
estimating a gain matrix for the first set of code channels,
deriving a data detection filter for the first set of code channels based on the gain matrix, and
performing data detection on the equalized signal with the data detection filter.

17. An apparatus comprising:
means for performing equalization on a received signal to obtain an equalized signal for a first set of code channels for one sector;
means for performing data detection on the equalized signal to obtain a detected signal for the first set of code channels;
means for performing reconstruction on the detected signal to obtain a reconstructed signal for the first set of code channels;
means for performing cancellation on the reconstructed signal for the first set of code channels from the received signal to obtain a modified received signal from the one sector; and
means for performing equalization, data detection, reconstruction, and cancellation for at least one additional set of code channels for another sector on the modified received signal from the one sector to obtain a modified received signal from the another sector and using the modified received signal from the another sector to determine a desired signal.

18. The apparatus of claim 17, further comprising:
means for determining received powers of a plurality of code channels for at least one sector; and
means for forming multiple sets of code channels based on the received powers, the multiple sets comprising the first set and the at least one additional set, the first set including code channels with strongest received powers, and
wherein equalization, data detection, reconstruction, and cancellation are performed sequentially for the multiple sets of code channels, one set of code channels at a time, starting with the first set having the strongest received powers.

19. The apparatus of claim 17, wherein the means for performing equalization comprises
means for deriving an equalizer matrix for the first set of code channels, and
means for performing equalization on the received signal with the equalizer matrix.

20. The apparatus of claim 17, wherein the means for performing data detection comprises
means for estimating a gain matrix for the first set of code channels,
means for deriving a data detection filter for the first set of code channels based on the gain matrix, and
means for performing data detection on the equalized signal with the data detection filter.

21. An apparatus comprising:
at least one processor configured according to executable instructions to determine received powers of multiple sectors, to sort the multiple sectors based on the received powers, from a strongest sector to a weakest sector, to perform equalization on a received signal to obtain an equalized signal for the strongest sector, to perform data detection on the equalized signal to obtain a detected signal for the strongest sector, to perform reconstruction on the detected signal to obtain a reconstructed signal for the strongest sector, to perform cancellation on the reconstructed signal for the strongest sector from the received signal to obtain a modified received signal from the strongest sector, to perform equalization, data detection, reconstruction, and cancellation for at least one additional sector among the multiple sectors on the modified received signal from the strongest sector to obtain a modified received signal from the at least one additional sector and using the modified received signal from the at least one additional sector to determine a desired signal; and a memory configured to store the executable instructions and coupled to the at least one processor.

22. An apparatus comprising:

at least one processor configured according to executable instructions to perform data detection on a received signal to obtain a detected signal for a first set of code channels for one sector, to perform reconstruction on the detected signal to obtain a reconstructed signal for the first set of code channels, to perform cancellation on the reconstructed signal for the first set of code channels from the received signal to obtain a modified received signal from the one sector, to perform data detection, reconstruction, and cancellation for at least one additional set of code channels for another sector on the modified received signal from the one sector to obtain a modified received signal from the another sector and using the modified received signal from the another sector to determine a desired signal; and a memory configured to store the executable instructions and coupled to the at least one processor.

23. The apparatus of claim 22, wherein the at least one processor is further configured to form multiple sets of code channels comprising the first set and the at least one additional set, and to perform data detection, reconstruction, and cancellation sequentially for the multiple sets of code channels, one set of code channels at a time.

24. The apparatus of claim 22, wherein the at least one processor is further configured to determine received powers of a plurality of code channels for at least one sector, to form multiple sets of code channels based on the received powers, the multiple sets comprising the first set and the at least one additional set, the first set including code channels with strongest received powers, and to perform data detection, reconstruction, and cancellation sequentially for the multiple sets of code channels, one set of code channels at a time, starting with the first set having the strongest received powers.

25. The apparatus of claim 22, wherein the at least one processor is further configured to determine a system matrix for the first set of code channels, to derive a data detection filter for the first set of code channels based on the system matrix, and to perform data detection on the received signal with the data detection filter.

26. The apparatus of claim 25, wherein the at least one processor is further configured to estimate variance of noise and interference for the first set of code channels and to derive the data detection filter further based on the variance of the noise and interference.

27. The apparatus of claim 25, wherein the at least one processor is further configured to derive the data detection filter in accordance with minimum mean square error (MMSE) or least squares (LS) technique.

28. The apparatus of claim 22, wherein the first set includes a subset of all code channels for one sector.

29. The apparatus of claim 22, wherein the first set includes all code channels for one sector.

30. The apparatus of claim 22, wherein the first set includes multiple code channels for multiple sectors.

31. A method comprising:

performing data detection on a received signal to obtain a detected signal for a first set of code channels for one sector;

to perform reconstruction on the detected signal to obtain a reconstructed signal for the first set of code channels;

to perform cancellation on the reconstructed signal for the first set of code channels from the received signal to obtain a modified received signal from the one sector; and performing data detection, reconstruction, and cancellation for at least one additional set of code channels for another sector on the modified received signal from the one sector to obtain a modified received signal from the another sector and using the modified received signal from the another sector to determine a desired signal.

32. The method of claim 31, further comprising:

determining received powers of a plurality of code channels for at least one sector;

forming multiple sets of code channels based on the received powers, the multiple sets comprising the first set and the at least one additional set, the first set including code channels with strongest received powers, and wherein data detection, reconstruction, and cancellation are performed sequentially for the multiple sets of code channels, one set of code channels at a time, starting with the first set having the strongest received powers.

33. The method of claim 31, wherein the performing data detection comprises determining a system matrix for the first set of code channels, deriving a data detection filter for the first set of code channels based on the system matrix, and performing data detection on the received signal with the data detection filter.

34. An apparatus comprising:

means for performing data detection on a received signal to obtain a detected signal for a first set of code channels for one sector;

means for performing reconstruction on the detected signal to obtain a reconstructed signal for the first set of code channels;

means for performing cancellation on the reconstructed signal for the first set of code channels from the received signal to obtain a modified received signal from the one sector; and means for performing data detection, reconstruction, and cancellation for at least one additional set of code channels for another sector on the modified received signal from the one sector to obtain a modified received signal from the another sector and using the modified received signal from the another sector to determine a desired signal.

35. The apparatus of claim 34, further comprising:

means for determining received powers of a plurality of code channels for at least one sector;

means for forming multiple sets of code channels based on the received powers, the multiple sets comprising the first set and the at least one additional set, the first set including code channels with strongest received powers, and wherein data detection, reconstruction, and cancellation are performed sequentially for the multiple sets of code channels, one set of code channels at a time, starting with the first set having the strongest received powers.

36. The apparatus of claim 34, wherein the means for performing data detection comprises
- means for determining a system matrix for the first set of code channels,
- means for deriving a data detection filter for the first set of code channels based on the system matrix, and
- means for performing data detection on the received signal with the data detection filter.

37. An apparatus comprising:
- at least one processor configured according to executable instructions to determine received powers of a plurality of users in at least one sector, to sort the plurality of users based on the received powers, from a strongest user to a weakest user, to form multiple user groups based on the sorted plurality of users, to perform data detection on a received signal to obtain a detected signal for a first user group among the multiple user groups, to perform reconstruction on the detected signal to obtain a reconstructed signal for the first user group, to perform cancellation on the reconstructed signal for the first user group from the received signal to obtain a modified received signal from that at least one sector, and to perform data detection, reconstruction, and cancellation for at least one additional user group in another sector among the multiple user groups on the modified received signal from that at least one sector to obtain a modified received signal from the another sector and using the modified received signal from the another sector to determine a desired signal; and
- a memory configured to store the executable instructions and coupled to the at least one processor.

* * * * *